United States Patent
Cooper et al.

(10) Patent No.: US 6,295,538 B1
(45) Date of Patent: Sep. 25, 2001

(54) METHOD AND APPARATUS FOR CREATING METADATA STREAMS WITH EMBEDDED DEVICE INFORMATION

(75) Inventors: Michael R. Cooper; Mark Joseph Hamzy; Patrick Edward Nogay; Mark Wayne Vanderwiele, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,969

(22) Filed: Dec. 3, 1998

(51) Int. Cl.$^7$ .............................. G06F 17/30; G06F 13/00; B41B 1/419
(52) U.S. Cl. ........................... 707/104; 710/31; 358/1.15; 358/1.16; 345/467
(58) Field of Search ..................... 707/104; 358/1.16, 358/1.15; 345/467; 710/31

(56) References Cited

U.S. PATENT DOCUMENTS

| | | | |
|---|---|---|---|
| 4,809,216 | 2/1989 | Lai ........................................ | 364/900 |
| 5,327,559 | 7/1994 | Priven et al. ........................ | 395/700 |
| 5,339,392 | 8/1994 | Rosberg et al. ..................... | 395/161 |
| 5,432,925 | 7/1995 | Abraham et al. ................... | 395/500 |
| 5,497,491 | 3/1996 | Mitchell et al. .................... | 395/700 |
| 5,507,003 | * 4/1996 | Pipkins ................................ | 710/31 |
| 5,509,115 | 4/1996 | Butterfield et al. ................. | 395/147 |
| 5,530,864 | 6/1996 | Matheny et al. .................... | 395/700 |
| 5,535,312 | * 7/1996 | Hammer et al. .................... | 358/101 |
| 5,583,982 | 12/1996 | Matheny et al. .................... | 395/326 |
| 5,602,974 | 2/1997 | Shaw et al. .......................... | 395/114 |
| 5,668,640 | 9/1997 | Nozawa et al. ..................... | 358/434 |
| 5,687,303 | 11/1997 | Motamed et al. ................... | 395/117 |
| 5,699,492 | 12/1997 | Karaki .................................. | 395/109 |
| 5,737,599 | * 4/1998 | Rowe et al. ......................... | 707/104 |
| 5,744,899 | 4/1998 | Burrows .............................. | 707/102 |
| 5,745,750 | 5/1998 | Butterfield et al. ................. | 395/118 |
| 5,748,188 | 5/1998 | Hu et al. .............................. | 345/326 |
| 6,057,858 | * 5/2000 | Desrosiers .......................... | 345/467 |
| 6,064,492 | * 5/2000 | Eldridge et al. .................... | 358/1.15 |
| 6,091,509 | * 7/2000 | Hickman et al. ................... | 358/1.16 |
| 6,134,017 | * 10/2000 | Schlank et al. ..................... | 358/1.15 |

OTHER PUBLICATIONS

International Business Machine; Displaying and Manipulating Relationships; Dec. 1995; pp. 391–395; IBM Technical Disclosure Bulletin; vol. 38, No. 12.

International Business Machines; Generation of Object Class Models from Process Methods of Workflow Environments; Aug. 1997; IBM Technical Disclosure Bulletin; vol. 40, No. 08; pp. 39–46.

International Business Machines; Structured Metadata for Application Specific Viewrs for Streamed Internet Video/Audio; Oct. 1997; IBM Technical Disclosure Bulletin; vol. 40, No. 10; pp. 123–127.

International Business Machines; Critical Page Caching in an External Memory Manager; Nov. 1995; IBM Technical Disclosure Bulletin vol. 38, No. 11.; pp. 187–190.

* cited by examiner

*Primary Examiner*—Thomas Black
*Assistant Examiner*—Frantz Coby
(74) *Attorney, Agent, or Firm*—Duke W. Yee; Jeffrey S. LaBaw

(57) ABSTRACT

A method and apparatus in a data processing system for generating a metadata stream. A request is received to render an object. A determination is made as to whether a device hint associated with the object is present. The object is placed in the metadata stream. The device hint is placed in the metadata stream, responsive to the device hint associated with the object being present. Then the device can take advantage of the hints without requiring it to preprocess the set of objects.

38 Claims, 6 Drawing Sheets

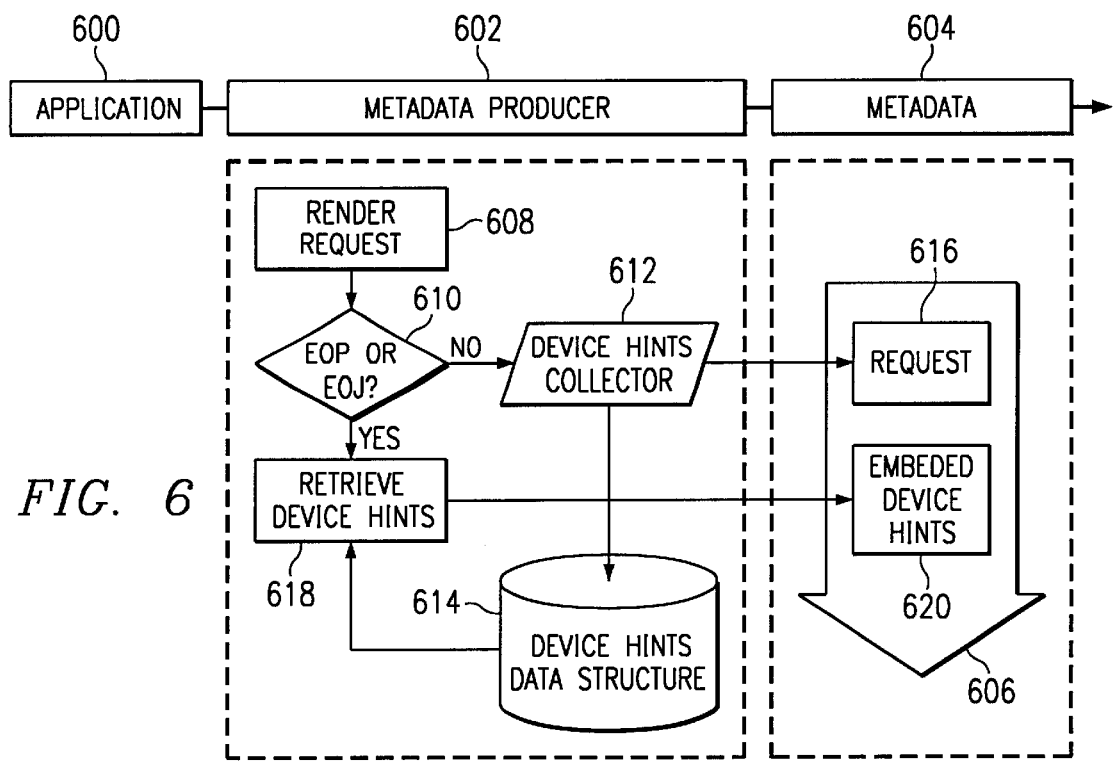
FIG. 6
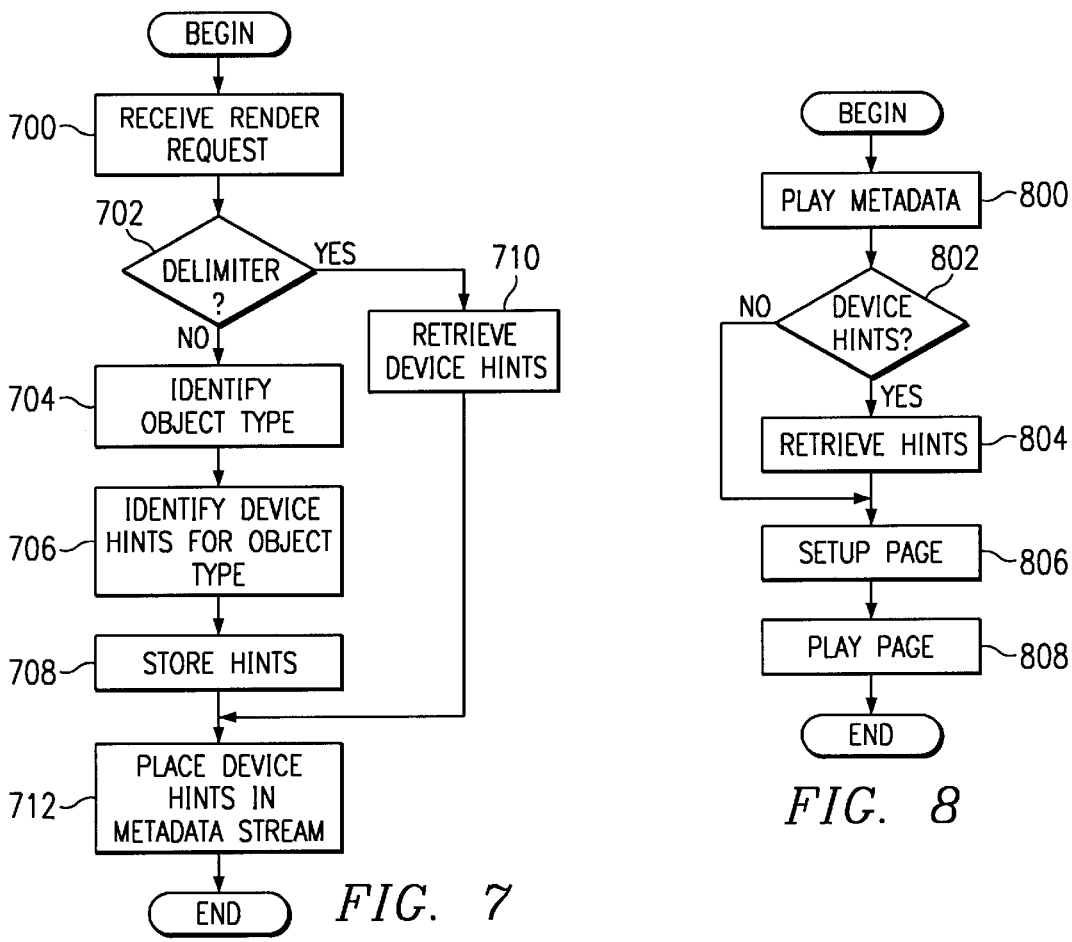
FIG. 7
FIG. 8

METHOD AND APPARATUS FOR CREATING METADATA STREAMS WITH EMBEDDED DEVICE INFORMATION

BACKGROUND OF THE INVENTION

1. Technical Field

The present invention relates generally to an improved data processing system, and in particular, to a method and apparatus for generating a data stream. Still more particularly, the present invention relates to a method and apparatus for generating or rendering a metadata stream.

2. Description of Related Art

Currently, metadata streams are created in the order that applications call graphical functions. Metadata is data about data. For example, the title, subject, author, and size of a file constitute metadata about a file. With respect to graphics, the current position, color, and size of a primitive, such as a box, constitute metadata for the box. With respect to a primitive, in computer graphics, a shape, such as a line, circle, curve, or polygon, that can be drawn, stored, and manipulated as a discrete entity by a graphics program. A primitive is one of the elements from which a large graphic design is created.

Metadata streams may be sent to printers and other output mediums for output, and/or stored for later processing, information transfer to other systems or applications. With respect to a printer, a printer is a computer peripheral that outputs text and/or a computer generated image on paper or on another medium. The amount of data sent to a printer can vary depending on information to be printed in a print job. A job is a specified amount of processing performed by a unit such as a computer or printer. Many printers do not have sufficient memory to print a full sheet. As a result, some printers are capable of printing only parts of a page at a time as a result of these memory constraints. This kind of printing is also referred to as "banding". For each band, a printer has to replay the entire metadata stream clipping the output to the current band. This reduces the performance in the output of such a printer. For example, if a printer has sufficient memory only for one quarter of a page, four passes of the metadata are required. In each pass, the portion or quarter of the metadata stream is used to print the portion or "band" of the page. As a result, in this example, four passes through the metadata would be required for one page of output.

Therefore, this is one example of how it would be desirable to have an improved method and apparatus for creating a metadata stream that can be processed more efficiently.

SUMMARY OF THE INVENTION

The present invention provides a method and apparatus in a data processing system for generating a metadata stream. A request is received to render an object. A determination is made as to whether a device hint associated with the object is present. The object is placed in the metadata stream. The device hint is placed in the metadata stream, responsive to the device hint associated with the object being present. At a logical end of a set of objects, the device hints are placed either before or after them. Then the device can take advantage of the hints without requiring it to preprocess the set of objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an illustration of the creation of the metadata stream in accordance with a preferred embodiment of the present invention;

FIG. 7 is a flowchart of the process used to embed hints in a metadata stream in accordance with a preferred embodiment of the present invention;

FIG. 8 is a flowchart of a process employed by a device driver for printing metadata in accordance with a preferred embodiment of the present invention;

DETAILED DESCRIPTION OF THE PREFERRED EMBODIMENT

Figure 1:
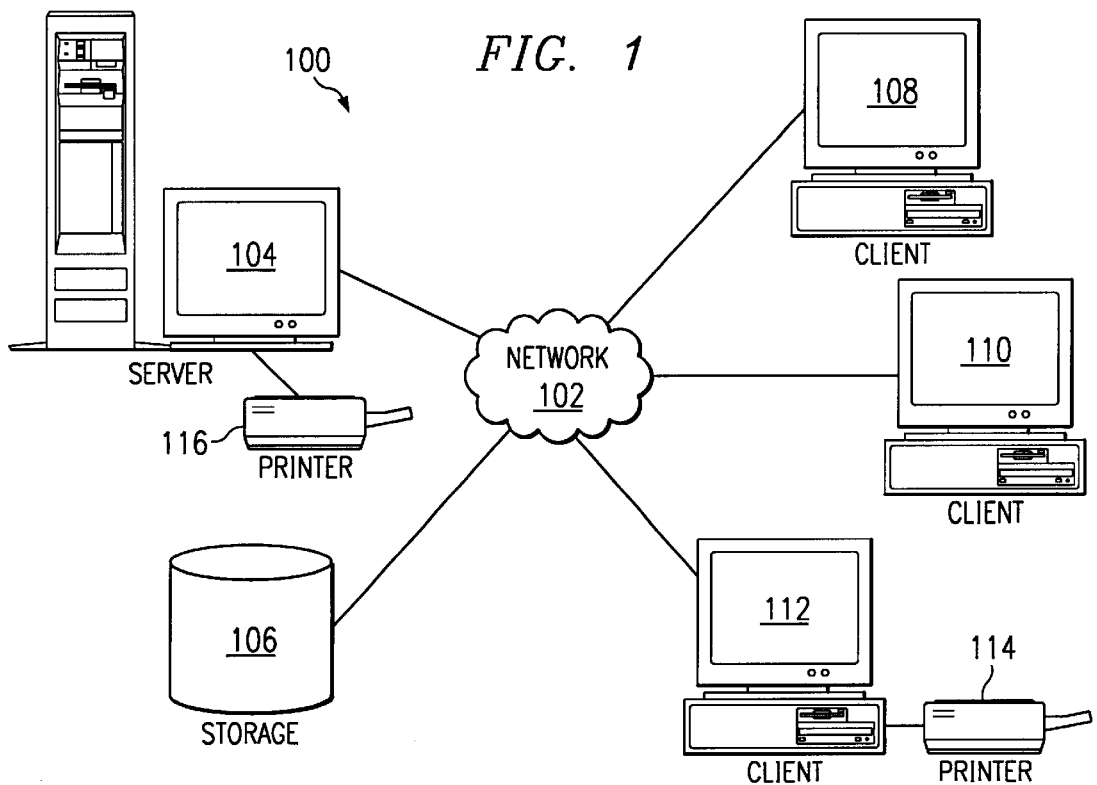
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110, and 112 also are connected to a network 102. These clients 108, 110, and 112 may be, for example, personal computers, pervasive devices, or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Metadata streams may be generated and processed within distributed data processing system 100. For example, client 112 may generate a metadata stream that is processed by an output device, or a driver for an output device, such as printer 114. Alternatively, another client, such as client 110, may generate a metadata stream and send it for output to printer 116 at server 104. A metadata stream also may be saved locally at a client or stored remotely in a storage unit, such as storage unit 106 for later processing.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet, a local area network (LAN), or a wide area network (WAN).

FIG. 1 is intended as an example, and not as an architectural limitation for the processes of the present invention.

Figure 2:
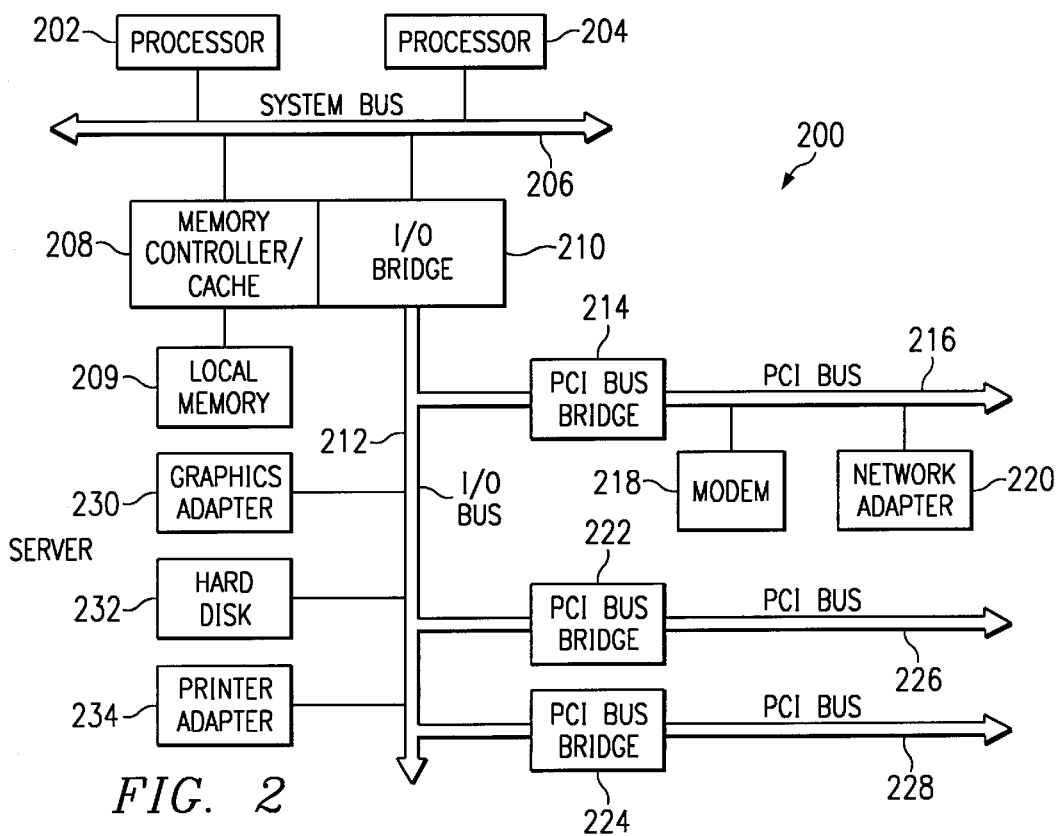
FIG. 2 is a block diagram depicting a data processing system, which may be implemented as a server.

Referring to FIG. 2, a block diagram depicts a data processing system which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230, printer adapter 234, and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
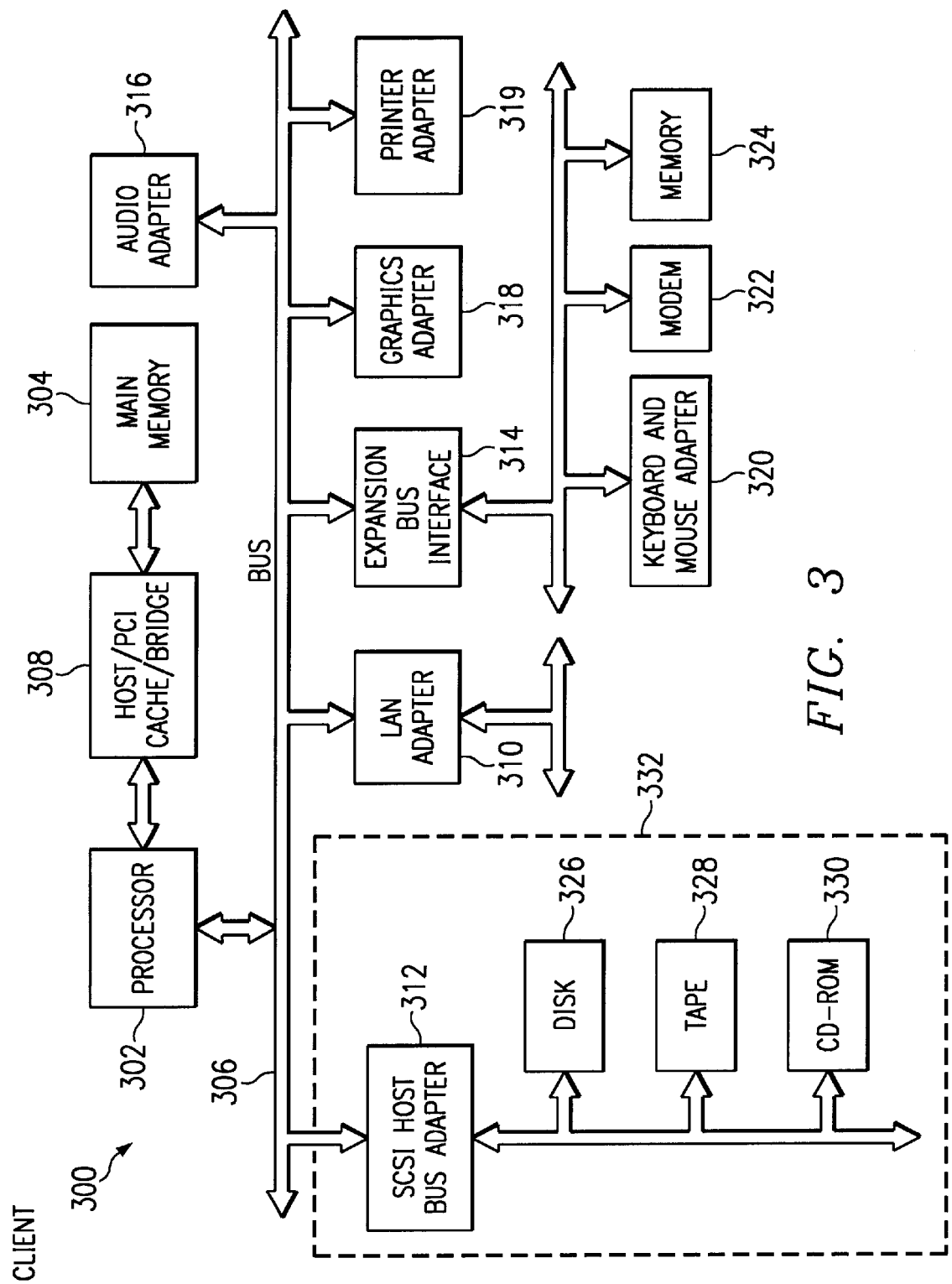
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and printer adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention. Although FIGS. 1–3 provide examples of configurations of computer systems on which the present invention may execute, the following background information may provide a context for understanding the overall computing environment in which the present invention may be used.

The present invention provides a method, apparatus, and instructions for embedding device hints in a metadata stream. Device hints are collections of resource information that device drivers can use to pre-configure their rendering environment before processing the metadata segment. Device hints give clues as to how to optimize code path and device resources. Device hints in this example are a super set of hints/clues that any particular device driver can use all of, some of, or none. Device hint information is usually common across multiple devices.

Device hints may include the number of fonts used, the type of fonts used, the colors used, the type of objects used, the size of a bounding box, the type of font encoding, data size, and pattern reuse. Objects along with resources in the form of device hints are embedded in a metadata stream. These device hints allow devices to take advantage of their hardware by allowing them to query resources, such as fonts, color used, color tables, and bounding boxes before playing or rendering a metadata stream. For example, if two colors are used, a device may render one bit per pel (bpp) instead of typical user defined bpp settings of 8 bpp, 16 bpp, 24 bpp, or 32 bpp. This information would reduce the rendered image resource by a factor of 8, 16, 24, or 32. For example, a user may set an output device at 24 bpp so that the user may obtain the best quality image. When the user prints a job that has a number of pages in which only two pages are color images, then the processes of the present invention may optionally be used to allow optimization of resources on the non-color image pages when this information is embedded within the metadata stream. In other words, the output device will dynamically adjust to the optimal format of the other pages.

Figure 4:
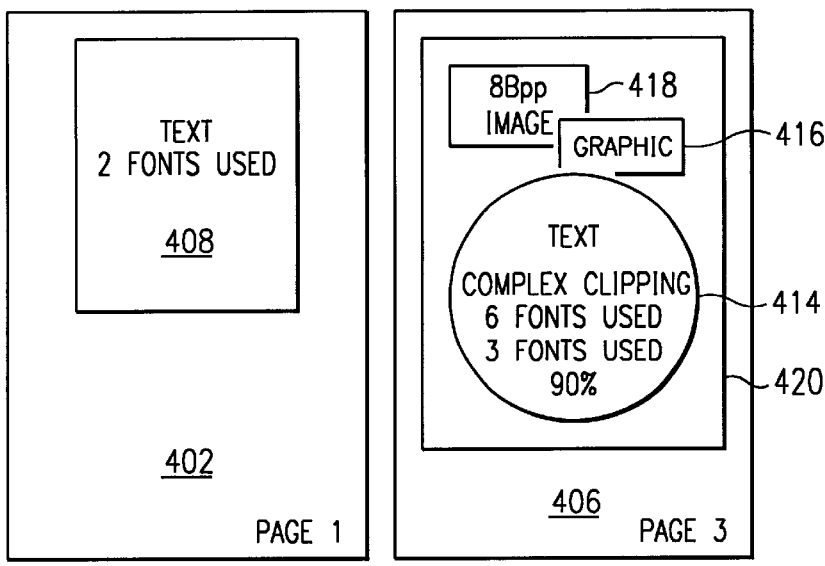
FIG. 4 is an illustration of device hints for a print job in accordance with a preferred embodiment of the present invention.
Figure 4:
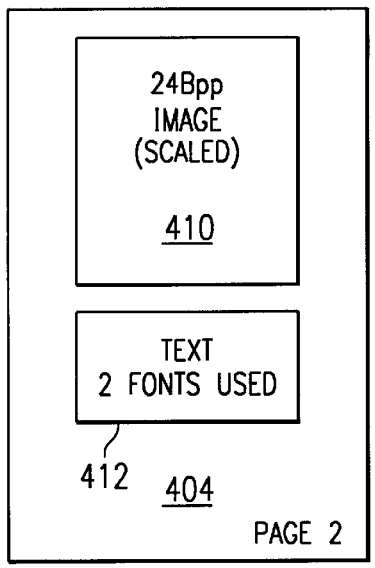

With reference now to FIG. 4, an illustration of device hints for a print job is depicted in accordance with a preferred embodiment of the present invention. In the depicted example, three pages are illustrated for print job 400, page 1 402, page 2 404, page 3 406. These pages include information that may be embedded as device hints in a metadata stream. For example, with respect to fonts, the number of unique fonts used on the current page or entire job is an example of a device hint. In this example, the font device hint is based on font names, not font size, or font attributes. In addition, the percentage of font use based on the number of glyphs can be calculated for optimal font caching in device memory. For example, one font may comprise eighty percent of the text in the print job or page, while the remaining fonts only comprise twenty percent of the text. In this situation, the font comprising eighty percent of the text in the print job would be cached in memory. The remaining fonts would not be cached, but loaded as needed.

Another device hint includes font format. This device hint defines the font types that are used to apply the metadata. This information can include the current standards of ATM, or TrueType, or some new standard like Bitstream. A device may use this device hint in a number of ways. For example, a device may take advantage of built in support within the device for one or more formats. If multiple formats are supported and the same font name was supported in multiple formats, the device would know which format was initially used because many devices have either embedded ATM or TT fonts or both.

Yet another device hint includes the colors used. This device hint allows a device to calculate the memory required to hold, and process, the data. In addition, this device hint may be used by the device to optimize mapping and conversion routines and color table creation can be tuned to the exact or most frequently used colors. Object identification is another device hint that may be used to process metadata files. Devices may process a metadata file in multiple passes to handle different objects. Three common objects found in a metadata stream include text, images, and graphical objects. Graphical objects may be, for example, rectangles, polygons, and triangles. These graphical objects may be filled or transparent. This information allows a device to optimize code paths and memory usage which reduces passes on the metadata to extract objects. Bounding box size is a device hint that helps a device to determine the used area of a page. This device hint may be used by banding devices that can print only parts of a page at a time due to memory constraints. With bounding box information, such a device can determine where to start the first band and how many bands to process optimally. In addition, if the bounding box is identified as null, then the device driver will be able to identify this page as a blank page. In addition, the bounding box of an object may be used to optimize clipping. If the bounds of an object is completely within the current set of clip rectangles, every object does not have to be checked against the clip rectangles. Font encoding is another device hint that allows for optimization of font handling and code paths based on font and coding. An example of a font and coding device hint is American Standard Code for Information Interchange (ASCII) and Unicode Text Format (UTF) (8, 16).

Data size is another device hint that may be used by a device for memory optimization and banding determinations. Pattern reuse is a device hint used for single pattern downloading in which the pattern is not flushed or removed from memory after the first use. The amount of pattern reuse allows a device to allocate the appropriate memory to optimize printing.

Still with reference to FIG. 4, page 1 402 in job 400 includes text 408. The device hints that may be embedded during creation of a metadata stream for job 400 would be as follows: Fonts: 2; Font Formats: ATM; Bounding Box: 7"×2" (the bounding box in this example is described using inches instead of the common device coordinates so that the reader can have a better visual understanding of the bounding box); Colors Used: 2; Object(s): Text. Page 2 404 includes image area 410 and text area 412. In this example, image 410 is a 24 bpp image while text area 412 uses two fonts. The device hint information for page 2 404 would be as follows: Fonts: 2; Font Formats: ATM; Bounding Box: 7"×10"; colors Used: 16,000,000; Object(s): Text Image; Transform: Image. Next, page 3 406 includes text 414, a graphic 416, and an 8 bpp image 418. In this example, a bounding area 420 also is present in page 3 406. The text includes complex clipping with six fonts being used. Three of these fonts are used in ninety percent of the text. The device hint embedded in the metadata stream for page 3 406 would be as follows: Fonts: 6; Font Formats: ATM, TT; Font 1:40%; Font 2:25%; Font 3:25%; Bounding Box: 7"×10"; Colors Used: 256; Object(s): Text, Image Graphic; Complex Clip: Text, Graphic; and Simple Clip: Image.

Figure 5:
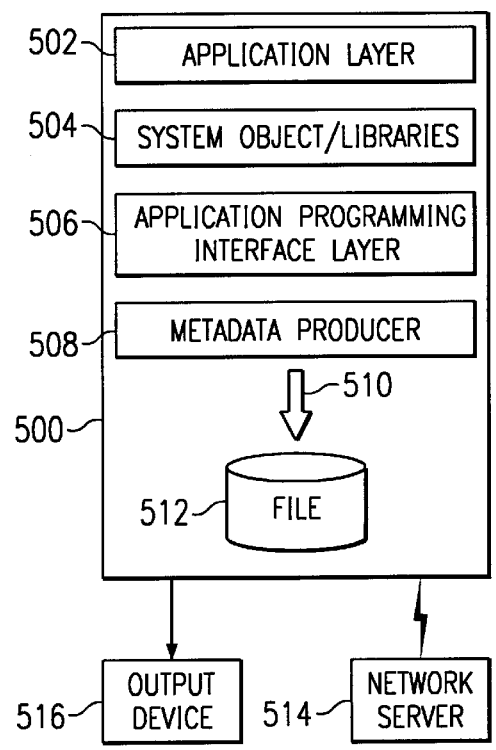
FIG. 5 is a block diagram of various components used in creating and managing metadata streams in accordance with a preferred embodiment of the present invention.

Turning now to FIG. 5, a block diagram of various components used in creating and managing metadata streams is illustrated in accordance with a preferred embodiment of the present invention. Data processing system 500 includes an application layer 502 that contains various objects and applications with which a user may interface. For example, an application within application layer 502 may be a spreadsheet application, word processing program or CAD program. The applications and objects within application layer 502 generate various attributes and primitive calls. System object/libraries 504 provides various functions that applications or objects within application layer 502 may call. For example, system object/libraries 504 may include code for generating and displaying scroll bar and list box objects so that this code does not need to be coded in an application within application layer 502. Application programming interface layer 506 receives calls either directly from application layer 502 or through system object/libraries 504. If an application within application layer 502 makes a call to system object/libraries 504, this layer will in turn make a call to application programming interface layer 506. Metadata producer 508, also referred to as a metafile producer, is code that supports application programming interface layer 506. For example, in Windows 95, the metadata producer would be a GDI system dynamic-link library (DLL). In OS/2, the metadata producer is a PMGPI. Metadata producer 508 generates a metadata stream 510 that may be stored in a file 512 within data processing system 500 or sent to a server 514, which may be on a network, such as, for example, a local area network, the Internet, or an intranet. Metadata stream 510 also may be sent to an output device 516, such as, for example, a printer or display device, and/or stored for later processing, information transfer to other systems, or applications. In the depicted example, metadata stream 510 may be sent directly to network server 514 or output device 516. Alternatively, metadata stream 510 may be first sent to file 512 and then to network server 514 or output device 516.

The depicted example in FIG. 5 is implemented in an operating system. This example however does not preclude the implementation of the processes of the present invention in other areas. The present invention may be implemented as a module outside of the operating system to process the metadata stream prior to the metadata stream being sent to an output device. For example, the module may be a print queue or print spooler.

With reference now to FIG. 6, an illustration of the creation of the metadata stream is depicted in accordance with a preferred embodiment of the present invention. Application 600 generates requests that are sent to metadata producer 602, which result in metadata producer 602 generating metadata 604. In this example, metadata 604 is in the form of a metadata stream 606. Metadata stream 606 is created in response to a render request 608 being received from application 600 at metadata producer 602. Metadata stream 606 includes primitives, attributes, and objects along with device hints generated and embedded in metadata stream 606 by the processes of the present invention. When render request 608 is received from application 600, a determination is made as to whether an end of page (EOP) or an end of job (EOJ) 610 has been received. If the answer to this determination is no, device hints are collected from render request 608 by device hints collector 612. These device hints are stored in a device hints data structure 614 by device hints collector 612. Device hints structure 614 may be stored in various storage devices, such as, for example, a hard disk drive or a random access memory. Device hints collector 612 then places a request 616 in metadata stream 606. Device hints collector 612 includes the processes necessary to extract information from the render request. For example, device hints collector 612 will extract the information such as bounding areas, the type of fonts, the type of graphics, or objects to be rendered. Device hints collector 612 also maintains statistics within device hints data structure 614 for use in creating device hints. For example, device hints collector 612 will track the number of fonts and colors for a particular page or job depending on the implementation. This information is placed within device hints data structure 614. In the depicted example, this data structure may be located on a hard disk or a random access memory. When a render request 608 is received in which an end of page or end of job is present, then the device hints are retrieved in block 618 from device hints data structure 614. At this time, the retrieved device hints are placed into metadata stream 606 as embedded device hints 620. These device hints are typically placed at the beginning or end of a page or job. The placement of the device hints depends on the particular implementation. A render request may include various objects, such as a character, text, polygon, or image bit block. If the metadata is being sent as a stream, typically the device hints will be placed at the end of the page or end of the job. If the metadata is being streamed, metadata information is generated and hints are collected as the stream is being generated. If data is sent a page at a time, the process may wait and place the device hints at the top of the page.

With reference next to FIG. 7, a flowchart of the process used to identify and embed hints in a metadata stream is depicted in accordance with a preferred embodiment of the present invention. The process begins by receiving a render request (step 700). This render request may be for an object, such as, for example, a character, primitive, or a compound object made up of multiple primitives. A determination is made as to whether the render request contains a delimiter (step 702). This delimiter may be, for example, an end of page or end of job. If a delimiter has not been encountered, the object type from the render request is identified (step 704). This object may be, for example, text, a primitive, or a compound object. Thereafter, hints are identified for the object type (step 706). The identified hints are stored (step 708). Then, the render request is placed/stored in the metadata stream (step 712).

With reference again to step 702, if a delimiter is encountered, the device hints are retrieved from the data structure (step 710). These device hints are then placed in the metadata stream (step 712) with the process terminating thereafter.

Turning now to FIG. 8, a flowchart of a process employed by a device driver for playing metadata is depicted in accordance with a preferred embodiment of the present invention. The process begins by playing metadata (step 800). Thereafter, a determination is made as to whether any device hints are present (step 802). If device hints are present, the hints are retrieved (step 804). Thereafter, the page is set up (step 806), and the page is played (step 808) with the process terminating thereafter.

With reference again to step 802, if the device hints are not present, the process proceeds directly to step 806 to set up the page as described above.

Figure 9A:
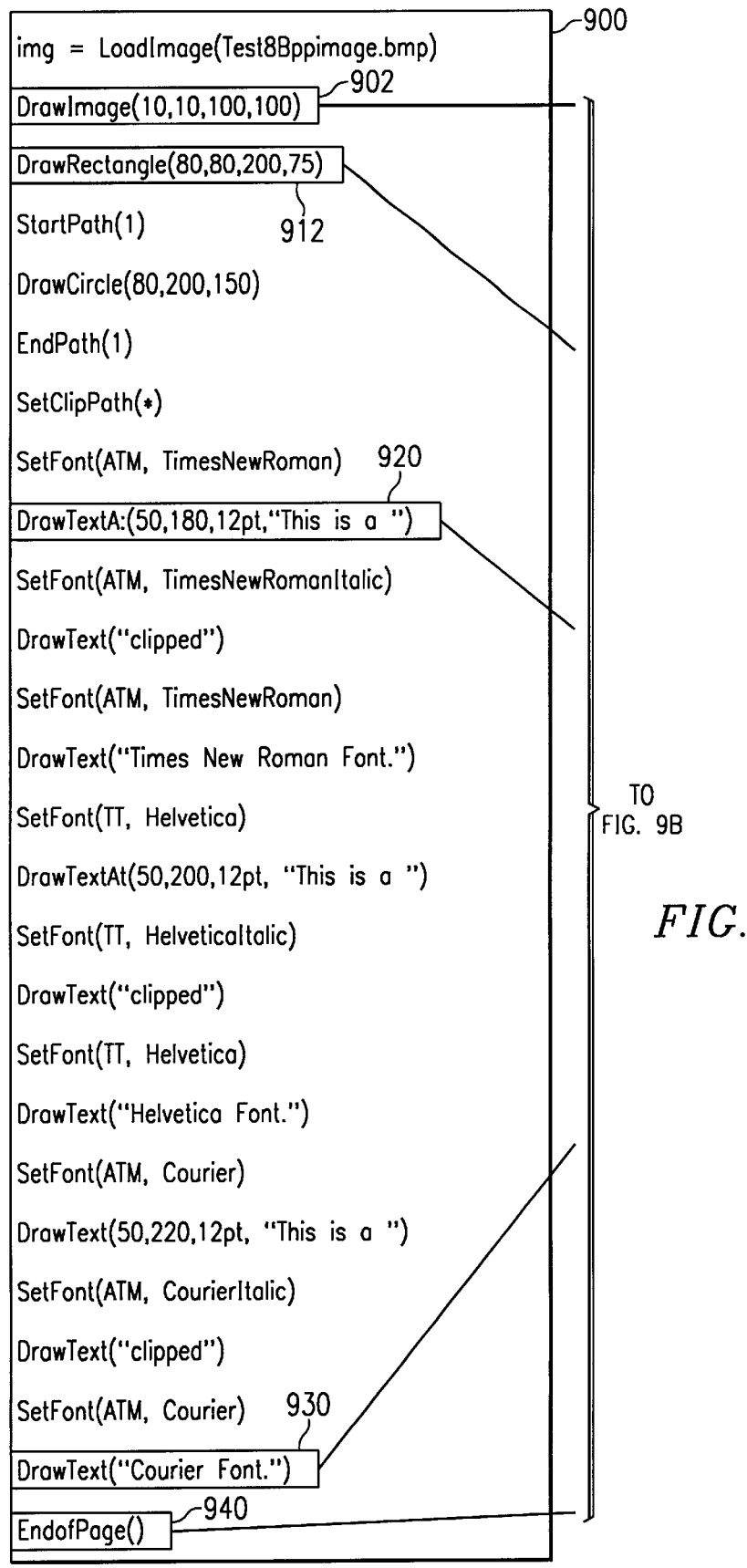
FIG. 9A is an illustration of the data flow used in creating device hints for a metadata stream in accordance with a preferred embodiment of the present invention.
Figure 9B:
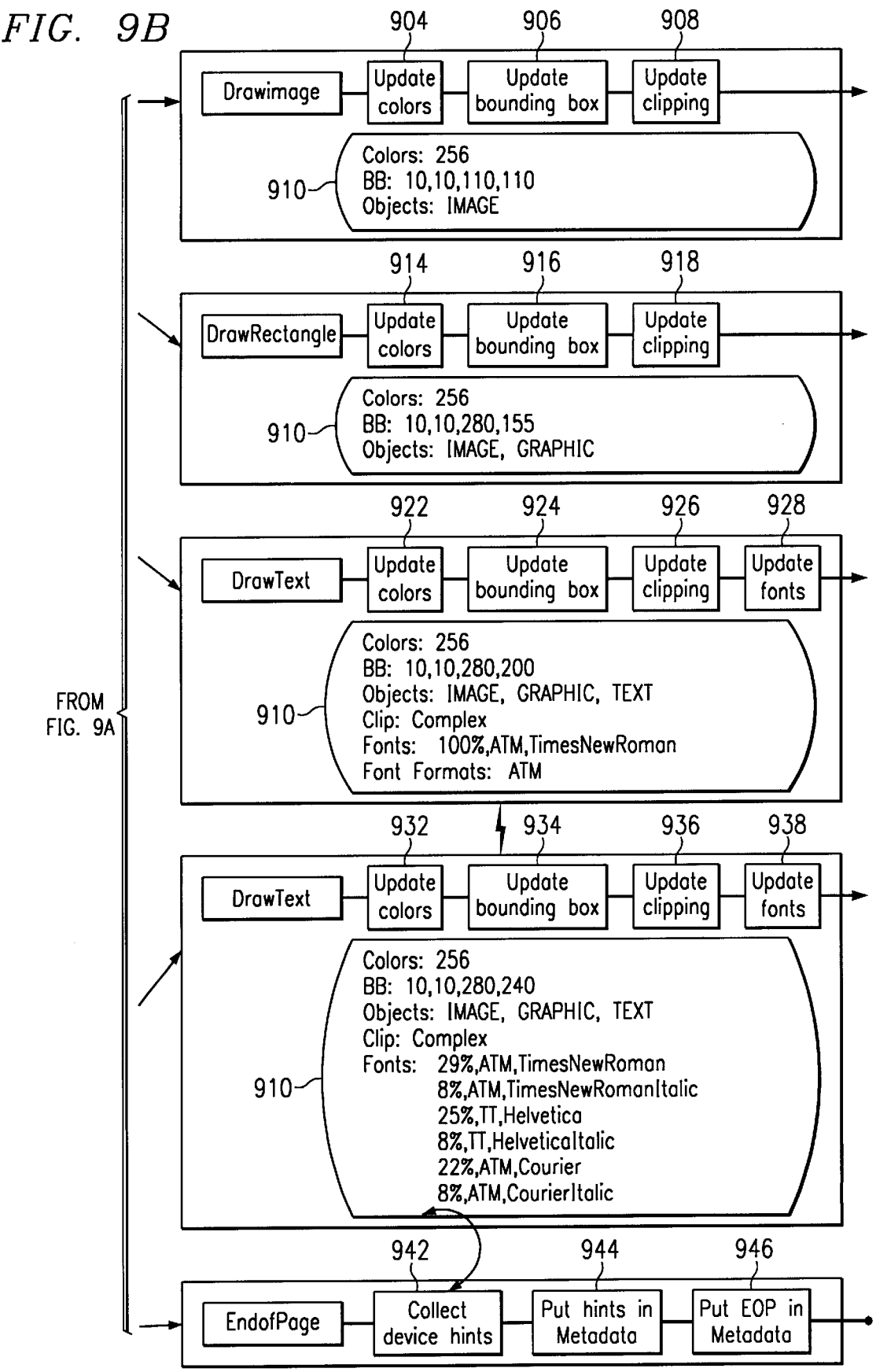
FIG. 9B is an illustration of the data flow used in creating device hints for a metadata stream in accordance with a preferred embodiment of the present invention.

Next, FIGS. 9A and 9B are an illustration of the data flow used in creating device hints for a metadata stream in accordance with a preferred embodiment of the present invention. Section 900 contains render requests for various objects sent to a metaproducer from an application. Render request 902 in section 900 is a draw image request. This request results in the processes of the present invention identifying device hints. In this example, the device hints includes the number of colors, the bounding box, and the type of clipping. Identification of these device hints results in the process updating colors in block 904, updating the bounding box device hint in block 906, and updating the clipping in box 908. In the depicted example, device hints are stored in data structure 910. As can be seen, at this time the device hints are as follows: colors are equal to 256; the bounding box (BB) is equal to 10, 10, 110, and 110; and object type is equal to IMAGE. No device hint for clipping is yet present in data structure 910 as a result of the update of clipping in block 908. This render request is then placed into a metadata stream.

Next, render request 912 in section 900 is a draw rectangle request. This request results in an update of colors in block 914, an update of the bounding box in block 916, and an update of the clipping in block 918. As a result of these updates, data structure 910 now includes the following device hints: colors are equal to 256; BB is equal to 10, 10, 280, 155 (in the depicted example, the device hint bounding box is an accumulation of the collection of render request bounding boxes); and objects are equal to IMAGE, GRAPHIC. Render request 912 is then placed into the metadata stream.

Next, render request 920 is a draw text request resulting in an update of colors in block 922, an update of the bounding box in block 924, an update of the clipping in block 926 and an update of fonts in block 928. These updates result in the following device hints within data structure 910: colors are equal to 256; BB is equal to 10, 10, 280, 200; objects are equal to IMAGE, GRAPHIC, TEXT; clip is equal to Complex; fonts are equal to 100%, ATM, TimesNewRoman; and font formats are equal to ATM. Render request 920 is then placed into the metadata stream.

In response to receiving render request 930, the request is identified as a draw text request. In response to this request, colors are update in block 932, the bounding box is updated in block 934, clipping is updated in block 936, and the fonts are updated in block 938. These updates result in the following device hints being located within data structure 910: colors are equal to 256; BB is set equal to 10, 10, 280, 240; objects are equal to IMAGE, GRAPHIC, TEXT; clip is equal to complex; and fonts are equal to 29%, ATM, TimesNewRoman; 8%, ATM, TimesNewRomanItalic; 25%, TT, Helvetica; 8%, TT, HelveticaItalic; 22%, ATM, Courier; 8%, ATM, CourierItalic. The render request is then placed in the metadata stream.

In response to receiving render request 940, an end of page request, the device hints are collected from data structure 910 in block 942. These hints are placed in the metadata stream block 944 then, the end of page is placed into the metadata stream in block 946.

Seven other render requests other than the ones described above are shown in FIGS. 9A and 9B. These requests are similar to render requests 920 and 930. As a result, these additional requests were not described to avoid obscuring the description of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a metadata stream, the method comprising:

receiving a request to render an object;

determining whether a device hint associated with the object is present and then collecting the device hint;

placing the object in a metadata stream; and responsive to the device hint being collected, storing the device hint(s) in the metadata stream after a segment has been completed.

2. The method of claim 1 further comprising:

storing the metadata stream as a metadata file.

3. The method of claim 1, wherein the metadata stream includes a beginning of a page and wherein the device hint is placed at the beginning of the page.

4. The method of claim 1, wherein the metadata stream includes an end of the page and wherein the device hint is placed at the end of the page.

5. The method of claim 1, wherein the metadata stream includes a beginning of a job and wherein the device hint is placed at the beginning of the job.

6. The method of claim 1, wherein the metadata stream includes an end of the job and wherein the device hint is placed at the end of the job.

7. The method of claim 1 further comprising:

storing the metadata stream in a storage device.

8. The method of claim 1 further comprising:

sending the metadata stream to an output device.

9. The method of claim 8, wherein the output device is a printer.

10. The method of claim 1 further comprising:

sending the metadata stream to a server connected to the data processing system by an Internet.

11. The method of clam 1, wherein the device hint is a font type.

12. The method of claim 1, wherein the device hint is an indication of the bounded area.

13. The method of claim 1, wherein the device hint is a size of the metadata contents.

14. The method of claim 1, wherein the device hint identifies a number of times the object is reused.

15. A method in a data processing system for printing, the method comprising:

receiving a request to render a plurality of objects;

determining whether device hints associated with the plurality of objects are present;

placing the plurality of objects in a metadata stream; and responsive to device hints associated with the plurality of objects being present, placing the device hints in the metadata stream.

16. A method in a data processing system for generating a metadata stream, the method comprising:

receiving a request to render a primitive;

determining whether a device hint associated with the primitive is present;

placing an object in a metadata stream; and responsive to a device hint associated with the object being present, placing an device hint in the metadata stream.

17. A printer system comprising:
a printer, wherein the printer has an input adapter configured to receive a metadata stream; and
a software module, wherein the software module is for use in sending the metadata stream to the printer and wherein the software module includes:
first instructions for receiving a request to render an object;
second instructions for determining whether a device hint associated with the object is present;
third instructions for placing the object in the metadata stream;
fourth instructions, responsive to the device hint associated with the object being present, for placing the device hint in the metadata stream; and
fifth instructions for sending the metadata stream to the printer.

18. The method of claim 17, wherein the software module is a printer queue module.

19. The method of claim 17, wherein the software module is part of the operating system for a computer.

20. A data processing system for generating a metadata stream, the data processing system comprising:
receiving means for receiving a request to render an object;
determining means for determining whether a device hint associated with the object is present;
first placing means for placing the object in the metadata stream; and
second placing means, responsive to device hint associated with the object being present, for placing the device hint in the metadata stream.

21. The data processing system of claim 20 further comprising:
storing means for storing the metadata stream as a metadata file.

22. The data processing system of claim 20, wherein the metadata stream includes a beginning of a page and wherein the device hint is placed at the beginning of the page.

23. The data processing system of claim 20, wherein the metadata stream includes an end of the page and wherein the device hint is placed at the end of the page.

24. The data processing system of claim 20, wherein the metadata stream includes a beginning of a job and wherein the device hint is placed at the beginning of the job.

25. The data processing system of claim 20, wherein the metadata stream includes an end of the job and wherein the device hint is placed at the end of the job.

26. The data processing system of claim 20 further comprising:
storing means for storing the metadata stream in a storage device.

27. The data processing system of claim 20 further comprising:
sending means for sending the metadata stream to an output device.

28. The data processing system of claim 27, wherein the output device is a printer.

29. The data processing system of claim 20 further comprising:
sending means for sending the metadata stream to a server connected to the data processing system by an Internet.

30. The data processing system of claim 20, wherein the device hint is a font type.

31. The data processing system of claim 20, wherein the device hint is an indication of the bounded area.

32. The data processing system of claim 20, wherein the device hint is a size of the metadata contents.

33. The data processing system of claim 20, wherein the device hint identifies a number of time the object is reused.

34. A data processing system for printing, the data processing system comprising:
receiving means for receiving a request to render a plurality of objects;
determining means for determining whether device hints associated with the plurality of objects are present;
first placing means for placing the plurality of objects in a metadata stream; and
second placing means, responsive to device hints associated with the plurality of objects being present, for placing the device hints in the metadata stream.

35. A data processing system for generating a metadata stream, the data processing system comprising:
receiving means for receiving a request to render a primitive;
determining means for determining whether a device hint associated with the primitive is present;
first placing means for placing an object in a metadata stream; and
second placing means, responsive to a device hint associated with the object being present, for placing the device hint in the metadata stream.

36. A computer program product in a computer readable medium for generating a metadata stream, the computer program product comprising:
first instructions for receiving a request to render an object;
second instructions for determining whether a device hint associated with the object is present;
third instructions for placing the object in a metadata stream; and
fourth instructions; responsive to a device hint associated with the object being present, for placing the device hint in the metadata stream.

37. A computer program product in a computer readable medium for printing, the computer program product comprising:
first instructions for receiving a request to render a plurality of objects;
second instructions for determining whether device hints associated with the plurality of objects are present;
third instructions for placing the plurality of objects in a metadata stream;
fourth instructions; responsive to device hints associated with the plurality of objects being present, for placing the device hints in the metadata stream.

38. A computer program product in a computer readable medium for generating a metadata stream, the computer program product comprising:
first instructions for receiving a request to render a primitive;
second instructions for determining whether a device hint associated with the primitive is present;
third instructions for placing the object in a metadata stream; and
fourth instructions; responsive to a device hint associated with the object being present, for placing the device hint in the metadata stream.

* * * * *

UNITED STATES PATENT AND TRADEMARK OFFICE
CERTIFICATE OF CORRECTION

PATENT NO. : 6,295,538 B1
DATED : September 25, 2001
INVENTOR(S) : Cooper et al.

Page 1 of 1

It is certified that error appears in the above-identified patent and that said Letters Patent is hereby corrected as shown below:

<u>Column 10,</u>
Line 42, "clam" should be -- claim --.

Signed and Sealed this

Nineteenth Day of March, 2002

Attest:

JAMES E. ROGAN
*Director of the United States Patent and Trademark Office*

*Attesting Officer*